Figure 3:
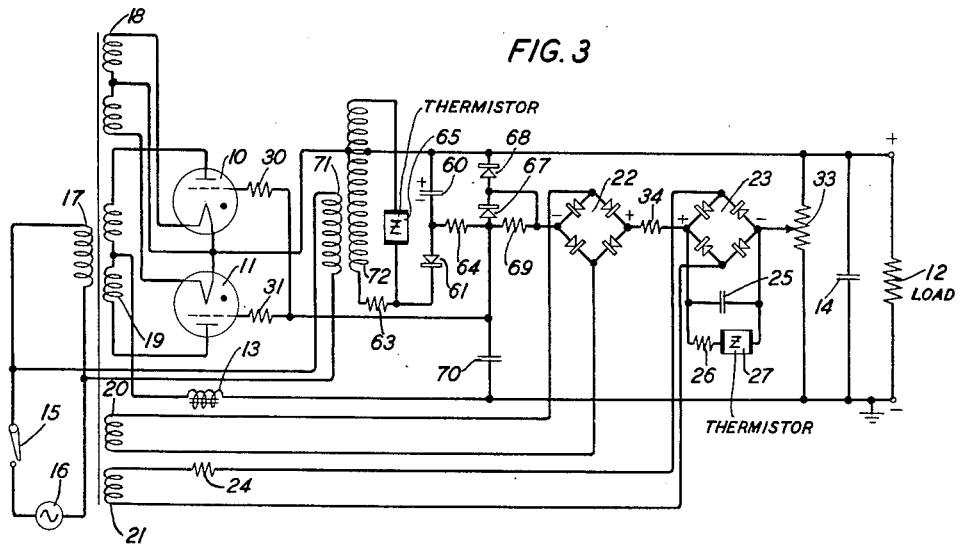

July 25, 1950
J. A. POTTER
2,516,799
CURRENT SUPPLY APPARATUS
Filed April 18, 1946
2 Sheets-Sheet 1
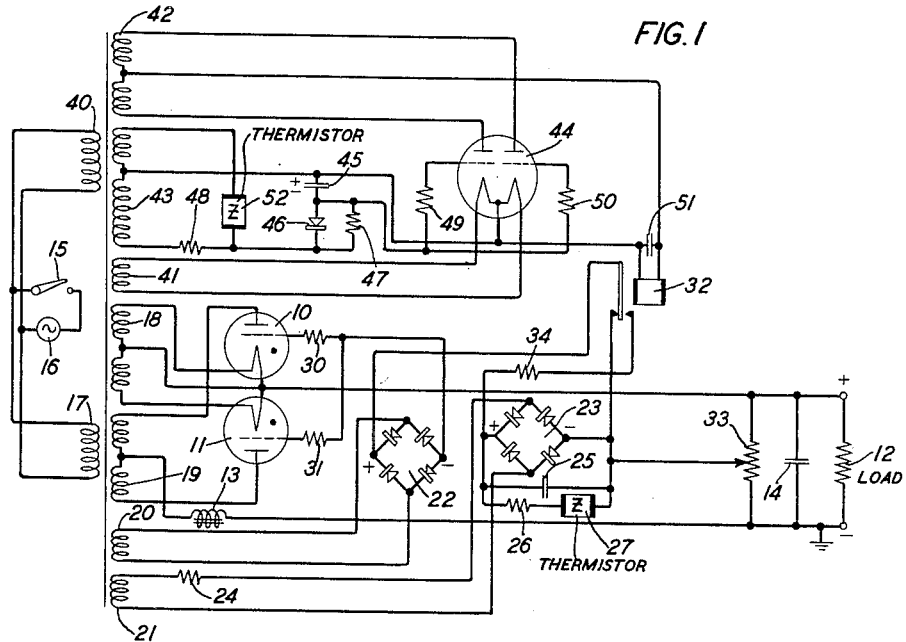
INVENTOR
J. A. POTTER
BY
*G. F. Heuerman*
ATTORNEY July 25, 1950 J. A. POTTER 2,516,799
CURRENT SUPPLY APPARATUS
Filed April 18, 1946 2 Sheets-Sheet 2

INVENTOR
J. A. POTTER
BY
G. F. Heuerman
ATTORNEY

Patented July 25, 1950

2,516,799

UNITED STATES PATENT OFFICE 2,516,799

CURRENT SUPPLY APPARATUS

James A. Potter, Rutherford, N. J., assignor to Bell Telephone Laboratories, Incorporated, New York, N. Y., a corporation of New York Application April 18, 1946, Serial No. 662,955

23 Claims. (Cl. 321—37)

This invention relates to time delay control apparatus and particularly to apparatus for controlling the supply of current from a space discharge rectifier to a load.

An object of the invention is to provide an improved timing control circuit.

Another object of the invention is to provide improved means for preventing or limiting the flow of space current in a space discharge device while the temperature of its cathode is below normal operating temperature.

A further object is to provide a novel circuit arrangement for controlling the charging and discharging of a condenser.

In a specific embodiment of the invention herein shown and described for the purpose of illustration, there is provided a regulated rectifier employing gas-filled space discharge tubes having thermionic cathodes of the oxide-coated type which may become damaged due to positive ion bombardment if anode current is permitted to flow while the cathode temperature is too low. There is therefore provided a time delay control circuit to which energizing current is supplied from a supply source of alternating current simultaneously with the supply therefrom of cathode heating current and of anode voltage for the rectifier tubes. The time delay circuit operates to apply a control electrode-cathode biasing voltage to the rectifier tubes to prevent or limit the flow of anode current in the tubes and thus avoid damaging the cathodes. The time delay circuit includes a condenser which is quickly charged through a circuit including an asymmetrically conducting device by current from the supply source, thereby setting up a voltage for biasing the control electrode negatively with respect to the cathode to prevent the flow of anode current. As used herein, an asymmetrically conducting varistor is a device having a much higher resistance to current flowing therethrough in one direction, called the reverse direction, than its resistance to current flowing therethrough in the opposite direction, called the forward direction. The delay circuit also includes a path in shunt with a portion of the condenser charging circuit comprising the condenser and the asymmetrically conducting device, said shunt path including a resistance means, known as a thermistor. Thermistors are described in an article by G. L. Pearson in Bell Laboratories Record for December 1940, page 106 et seq. As described in the article, thermistors are made from a class of materials known as semiconductors which have a relatively large negative temperature coefficient of resistance. The term thermistor as used herein has this meaning. When the temperature of the thermistor has increased to a certain value, the voltage drop across it is sufficiently reduced to cause the charging of the condenser to be interrupted and to cause the condenser to discharge, the discharge taking place at a relatively slow rate compared with the charging rate.

After a delay period determined by the time constant of the condenser discharge circuit, the voltage across the condenser terminals reaches the critical grid-cathode voltage of the rectifier tubes for which the flow of space current through the tubes and the resulting supply of rectified current to the load are initiated. The condenser continues to discharge to cause the load current to increase gradually until the operating output voltage is reached. After a power interruption, the starting cycle, as described above, is repeated except that, where the period of interruption is short, the thermistor bead remains partly heated. As a result the voltage across the thermistor and the maximum voltage to which the condenser becomes charged are relatively low and the time required for discharging the condenser to a voltage where space current in the rectifier tubes is initiated, is relatively short.

In a modified arrangement in which a thermistor is not required, a condenser is charged through the relatively high reverse resistance of an asymmetrically conducting element and the voltage across the asymmetrically conducting element is used to bias the control electrode-cathode circuit of the space discharge rectifying device to delay conduction therein during the period in which the condenser is being charged. After conduction is initiated, grid current flows through the asymmetrically conducting element in its forward or low resistance direction, thereby providing a low resistance coupling to the load circuit so that the space current may be controlled in a manner to maintain the load voltage substantially constant.

Figure 4:
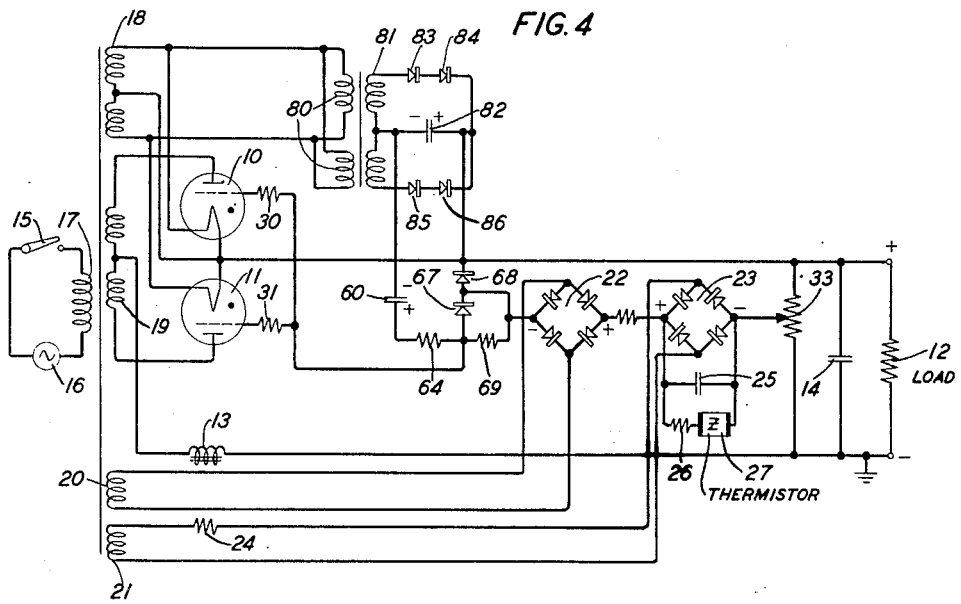

Fig. 1 of the accompanying drawing is a schematic view of a regulated rectifier embodying the invention; and Figs. 2, 3 and 4 are schematic views of regulated rectifiers which are modifications of the regulated rectifier shown in Fig. 1.

Referring now to Fig. 1 of the drawing, there is shown a rectifier comprising three-electrode, gas-filled, space discharge rectifier tubes 10 and 11 for supplying rectified current to a load 12 through a ripple filter comprising a series choke coil 13 which may be a so-called "swinging"

choke, and a shunt condenser 14. When a switch 15 is closed, current from an alternating current source 16 is supplied to the primary winding 17 of a transformer having secondary windings 18, 19, 20 and 21. Secondary winding 18 supplies heating current to the cathodes of tubes 10 and 11, winding 19 supplies anode current to tubes 10 and 11, winding 20 supplies current to an auxiliary bridge rectifier 22 and winding 21 supplies current to a second auxiliary bridge rectifier 23 through a series resistor 24 of 9500 ohms. Across the output terminals of the bridge rectifier 23 are connected two parallel branch paths, one comprising a two-microfarad condenser 25 and the other comprising in series a 520-ohm resistor 26 having a positive temperature coefficient of resistance and in series therewith a negative temperature coefficient resistor or thermistor 27. The voltage across the output terminals of rectifier 23 is thus maintained substantially constant irrespective of changes of the supply voltage as described in United States Patent 2,356,269, granted to me August 22, 1944. The output voltage of rectifier 22 has variations corresponding to changes of line voltage from source 16.

The control electrodes of tubes 10 and 11 are connected through resistors 30 and 31 respectively, each of 22,000 ohms, to the negative output terminal of rectifier 22. There is provided an electromagnetic relay 32 which, when its armature is released, as shown on the drawing, completes a conductive path from the positive output terminal of rectifier 22 to the adjustable tap of a potentiometer 33 connected across the load 12. A circuit is thus completed for biasing the control grids of tubes 10 and 11 negatively with respect to the cathodes so as to prevent the flow of space current in rectifier tubes 10 and 11. When relay 32 is energized, as will be described below, the grid-cathode circuit of tubes 10 and 11 may be traced from the grids through the respective resistors 30 and 31 to the negative output terminal of rectifier 22, from the positive terminal of rectifier 22 through the relay contacts and through resistor 34 of 22,000 ohms to the positive terminal of rectifier 23 and from the negative terminal of rectifier 23 to the adjustable tap of potentiometer 33 and thence through a portion of the potentiometer to the cathodes of tubes 10 and 11. The control grids are thus made relatively less negative with respect to the cathodes so as to cause the rectifier tubes 10 and 11 to pass space current to the load. During operation, the voltage across the load is regulated due to the voltage drop across the portion of potentiometer 33 between the positive load terminal and the adjustable tap being in the grid-cathode circuits of tubes 10 and 11. When the load voltage rises, for example, the control grids are made relatively more negative with respect to the cathodes so as to minimize the rise of load voltage. Similarly, when the line voltage rises, for example, the output voltage of rectifier 22 rises to make the grids of tubes 10 and 11 relatively more negative, thereby preventing or minimizing a rise of load voltage as a result of the line voltage increase.

The time delay circuit for causing the energization of relay 32 after a delay period during which the cathodes of tubes 10 and 11 are being brought to operating temperature will now be described. There is provided a transformer having a primary winding 40 to which current from source 16 is supplied when switch 15 is closed. The transformer has a winding 41 for supplying heating current to the cathodes of a twin triode space discharge device 44, a winding 42 for supplying space currents to the triodes of tube 44 and a winding 43 for supplying current to a circuit for controlling the charge on a two-microfarad condenser 45. The voltage across condenser 45 is impressed upon the control grid-cathode circuits of tube 44 for controlling the space currents therein, which currents are supplied to the winding of relay 32, the positive terminal of condenser 45 when charged, being connected to the cathodes of tube 44 and the negative terminal being connected through 47,000-ohm resistors 49 and 50, respectively, to the control grids of the triodes. A 0.5-microfarad filtering condenser 51 is connected across the relay winding. The charging circuit of condenser 45 comprises in series the major portion of the secondary transformer winding 43, condenser 45 and asymmetrical conducting device or varistor 46, shunted by 4.7-megohm resistor 47, and 3900-ohm resistor 48. Varistor 46 has a relatively low resistance to current in one direction which charges condenser 45 and a much higher resistance to current in the opposite direction. Varistors are described in an article by J. A. Becker in Bell Laboratories Record for July 1940, page 322 et seq. Connected in a shunt path across condenser 45 and varistor 46 in series is a current path comprising in series a small portion of winding 43 and a resistance means 52 having a large negative temperature coefficient of resistance, said resistance means being known as a thermistor.

When the switch 15 is closed, current is supplied to the bridge rectifiers 22 and 23, heating current is supplied to the cathodes of tubes 10, 11 and 44 and anode voltage is supplied to tubes 10, 11 and 44. Current is also supplied to the time delay circuit connected to transformer winding 43. The condenser 45 is charged through the relatively low forward resistance of varistor 46 and resistor 48 and, as a result, the triodes of tubes 44 are biased to cut-off to prevent the supply of operating current to relay 32. With relay 32 unactuated, the flow of space current through rectifier tubes 10 and 11 is prevented due to the negative grid bias which is supplied from the bridge rectifier 22. Current also flows in the shunt path comprising thermistor 52 to cause its resistance to decrease as its temperature increases due to the current flowing therethrough. As the resistance of thermistor 52 decreases, the voltage drop across the thermistor decreases and that across resistor 48 increases. Therefore the voltage across the portion of the circuit consisting of condenser 45 and varistor 46, shunted by resistor 47, decreases. Condenser 45 thus discharges through a circuit having a relatively high time constant, that is, through a circuit including the relatively high reverse resistance of varistor 46, shunted by 4.7-megohm resistor 47. During a delay period equal to the time required for the cathodes of tubes 10 and 11 to reach operating temperature, the voltage across condenser 45 is reduced sufficiently to cause the anode currents of the triodes of tubes 44 to operate relay 32. The negative grid bias of rectifier tubes 10 and 11 which prevented the flow of space current while the cathodes thereof were being brought to operating temperature is thus changed to an operating bias which allows rectified current to be supplied to the load. In case the power is interrupted for a relatively short time such that the cathodes of tubes 10 and 11 are only partially cooled, a relatively short period is required for increasing the cathode temperature to the operating value. The shorter delay time is realized due to the fact that the thermistor 52 has likewise only partially cooled during the relatively brief power interruption with the result that the maximum voltage to which condenser 45 becomes charged prior to the starting of its discharge is relatively low. The delay interval between the time of restoration of power and the time of operation of relay 32 is thus correspondingly reduced.

While the time delay equipment of Fig. 1 has the advantage of being relatively inexpensive, it also has the disadvantage that maintenance for the relay 32 and for the space discharge tube 44 is required. Moreover, the apparatus is not adapted for use in certain locations where vibration may result in false operation of the relay armature. The modified time delay apparatus which will now be described in connection with Fig. 2 of the drawing does not require an electromagnetic relay or a space discharge device for supplying rectified current to the relay winding. The regulated rectifying apparatus for supplying rectified current to a load is the same in Fig. 2 as that shown in Fig. 1 and the corresponding parts are similarly designated in the two figures.

When switch 15 of Fig. 2 is closed, condenser 60 is quickly charged from the voltage across the lower half of secondary transformer winding 19, as viewed in the drawing, through a circuit comprising choke coil 13, load 12, condenser 60, varistor 61, 4700-ohm resistor 62 and 18,000-ohm resistor 63. The positively charged plate of condenser 60 is connected to the cathodes of rectifier tubes 10 and 11 and the negative condenser plate is connected through a one-megohm resistor 64 and through resistors 30 and 31, respectively, to the control electrodes or grids of tubes 10 and 11. The grids are thus biased negatively with respect to the cathodes to prevent the flow of anode current in tubes 10 and 11 during an initial delay period, while the cathode temperature is increasing.

A thermistor 65 is connected in shunt with respect to the portion of the condenser charging circuit consisting of condenser 60, varistor 61, and resistor 62, all in series. The common terminal of varistor 61 and resistor 62 is connected through 0.1-megohm resistor 66 to the upper terminal of transformer winding 19. Connected across the condenser 60 is a path comprising resistor 64, varistor 67 and varistor 68, all in series, the varistor 67 being shunted by 10-megohm resistor 69. The common terminal of varistors 67 and 68 is connected to the negative terminal of bridge rectifier 22. A 0.5-microfarad condenser 70 has one of its plates connected to the common terminal of resistors 30 and 31 and its other plate connected to the grounded load terminal.

Current supplied to the thermistor 65 increases its temperature so that in less than a second after the supply of current thereto has been initiated, its resistance has decreased from about 50,000 ohms to about 850 ohms. The voltage drop across the thermistor is thus decreased and condenser 60 discharges. Current from transformer winding 19 is also supplied to a circuit comprising in series resistor 66, resistor 62 and resistor 63 to produce a voltage drop across resistor 62 which is in phase opposition to the voltage across thermistor 65 and substantially equal thereto when the thermistor has been heated substantially to its maximum operating temperature. Thus during the first second following the closing of switch 15 condenser 60 has attained its maximum charge and the effective alternating voltage in the charging circuit, that is, the vector sum of the voltage across thermistor 65 and the voltage across resistor 62, has been reduced substantially to zero. Condenser 60 therefore discharges through a circuit comprising thermistor 65, resistor 62 and the reverse resistance (about 25 megohms) of varistor 61. A second discharge path for condenser 60 comprises varistor 68, varistor 67 shunted by resistor 69, and resistor 64. Varistor 67 has a high resistance (about eight megohms) to the discharge current while the resistance of varistor 68 at this time is relatively low. This is due to the fact that the resultant voltage in the circuit comprising potentiometer 33 and bridge rectifiers 22 and 23 has a polarity such as to cause current to flow through varistor 68 in its forward or low resistance direction. The varistors 67 and 68 in series are in the grid-cathode circuits of tubes 10 and 11, these varistors being in shunt with respect to condenser 60 and resistor 64 in series. The resultant voltage drop across varistors 67 and 68 in series thus decreases as the condenser 60 discharges, thereby causing conduction in tubes 10 and 11 after a delay period. The voltage drops across the varistors, respectively, are opposed but that across varistor 67 is of larger magnitude than that across varistor 68 because, for the direction of the currents flowing through the varistors, the resistance of varistor 67, together with its shunt resistor 69, is much larger than the resistance of varistor 68. The provision of varistor 68 has the effect of reducing the voltage component in the grid-cathode circuit which opposes the voltage drop across varistor 67 during the starting period. Without varistor 68, this opposing voltage component would be the vector sum of the output voltages of bridge rectifiers 22 and 23.

In approximately 15 seconds after the closure of switch 15, condenser 60 will have discharged sufficiently to permit the flow of space current in tubes 10 and 11. It will be noted that, when conduction is initiated in tubes 10 and 11, current from transformer 19 flows not only in a circuit including the space between the anode and the cathode of each tube and thence through the load circuit and back to the source, but also in a circuit including the space between the anode and control electrode of each tube and thence through resistors 30 and 31, varistors 67 and 68, through the load and thence back to the source. When space current is initiated, the condenser 60 continues to discharge but at an increased rate for about one second due to the grid current flow and the resulting change of resistance of varistor 67 from its high reverse resistance to its low forward resistance, thereby causing the space current to increase gradually. When current is supplied to the load, the voltage across varistor 68 is a resultant of the output voltages of bridge rectifiers 22 and 23 and the voltage across the portion of potentiometer 33 between the positive load terminal and the adjustable tap. This resultant voltage is in such a direction as to cause a small current flow from the positive load terminal through varistor 68, bridge rectifiers 22 and 23 and through a portion of potentiometer 33 to the grounded negative load terminal. In operation therefore the resistance of varistor 68 is high and does not have any appreciable shunting effect on the control circuit. The coupling of the starting time delay circuit to the control grids of tubes 10 and 11 also has a high resistance because of the series resistor 64. During conducting periods of tubes 10 and 11, grid current flows through a circuit comprising varistor 67, bridge rectifiers 22 and 23 and a portion of potentiometer 33 to ground. The varistor 67 therefore provides a low resistance coupling from the potentiometer 33 to the grid resistors 30 and 31.

During normal operation when a small increase in load voltage takes place due to a decrease in load, for example, the control electrodes of tubes 10 and 11 are made relatively more negative with respect to the cathodes, thereby causing less rectifier current to be supplied to the load circuit and causing the increase in load voltage to be minimized. Similiarly when the supply voltage increases, for example, the output voltage of bridge rectifier 22 increases to make the grids of tubes 10 and 11 relatively more negative with respect to the cathode potential, thereby tending to prevent a rise in load voltage. When the load is decreased by an abnormally large amount, for example, the grids of tubes 10 and 11 may become more negative with respect to the cathodes to such an extent as to cause the interruption of space current in the tubes 10 and 11. If condenser 70 were not provided, condenser 60 would recharge to cause the space current to be interrupted for about ten seconds. However, with condenser 70 present in the circuit, as shown in the drawing, condensers 60 and 70 are charged in series from the load voltage with the result that the charge on condenser 60 is relatively small so that the voltage in the grid-cathode circuit due to the charge on condenser 60 does not cause a delay in the restoration of conduction in tubes 10 and 11.

The arrangement shown in Fig. 3 is similar to that shown in Fig. 2, the corresponding parts bearing the same designations in the two figures. It will be noted that the circuit comprising resistors 62 and 66 in Fig. 2 is omitted in Fig. 3. The arrangement for supplying energy to the time delay circuit of Fig. 3 is similar to that shown in Fig. 1. It comprises a transformer having a primary winding 71 to which alternating current is supplied from source 16 when switch 15 is closed, and a secondary winding 72.

The purpose of providing a delay period during which no space current flows in the rectifier tubes 10 and 11 is to prevent damage to the cathodes of the tubes due to the flow of space current while the cathode temperature is below the operating value. If in a certain type of tube a period of 15 seconds, for example, is required to bring the cathodes up to operating temperature from room temperature, the circuit should function to maintain the rectifier control grid sufficiently negative with respect to the cathode during this 15-second interval as to prevent the flow of space current. Thereafter, preferably, the grid bias should increase gradually in the positive direction to cause the space current to rise gradually to normal operating value in about one second, for example. When the power supply from source 16 to the rectifying circuit is interrupted for a relatively short period, five seconds, for example, the rectifier tube cathode remains partly heated so that a delay period of less than 15 seconds is required to bring it up to operating temperature. This shortened delay period is realized because the thermistor also remains partly heated, thus causing the maximum voltage to which condenser 60 becomes charged when the power is restored to be less than the maximum voltage to which the condenser becomes charged when thermistor 65 has had time to cool to room temperature due to a longer power interruption. For power interruptions of still shorter duration, say one second, there will be no delay interval. It is thus seen that the circuits embodying the invention are designed to give only the time delay required for bringing the rectifier tube cathodes up to operating temperature, the shorter the power interruption, the shorter the time delay in the restoration of the rectified current to the load.

The arrangement shown in Fig. 4 is a modification of the arrangement shown in the preceding figures in which a thermistor 65 is not required. The elements of Fig. 4 which correspond to similar elements in the preceding figures are similarly designated. In this arrangement there is provided a transformer having parallel-connected primary windings 80 to which current is supplied from transformer winding 18 and a secondary winding 81 for supplying current for charging 0.2-microfarad condenser 82 through varistors or rectifying elements 83, 84, 85 and 86. The resistance of resistor 64 is 10,000 ohms and that of resistor 69 is three megohms.

When the switch 15 is closed, condenser 82 is charged quickly to set up a voltage for charging two-microfarad condenser 60 through a high time constant circuit comprising varistor 68, varistor 67 shunted by resistor 69 and resistor 64. The voltage drop across varistors 67 and 68 biases the control grids of tubes 10 and 11 negatively with respect to the cathodes. As the condenser 60 charges, this biasing voltage decreases exponentially until a bias voltage is reached which causes space current to be initiated in tubes 10 and 11.

As in the embodiment of Figs. 2 and 3, so also in the embodiment of Fig. 4 the varistor 68 has a low resistance during the starting period because of the resultant voltage produced by the bridge rectifiers 22 and 23 and the current which flows from these sources through varistor 68, through the load to ground and through a portion of potentiometer 33. This current component is much larger than the charging current for condenser 60. During the starting period varistor 67 is in the high resistance state due to the charging current for condenser 60 flowing through it. The grid-cathode biasing voltage of tubes 10 and 11 is the vector sum of the voltages across varistors 67 and 68. This voltage is of such polarity as to make the grids negative with respect to the cathodes and this voltage decreases in magnitude, that is, becomes less negative exponentially as the condenser 60 becomes charged. When the tubes 10 and 11 pass space current to set up a voltage across the load, the current through varistor 68 reverses to change its resistance from a low to a high value. The current through varistor 67 also reverses due to grid current flowing in the circuit comprising varistor 67, bridge rectifiers 22 and 23 and a portion of potentiometer 33 to ground. The resistance of varistor 68 now being high, the shunting effect of this element on the control voltage proportional to the load and line voltages from potentiometer 33 and bridge rectifier 22, respectively, is substantially eliminated. The resistance of varistor 67 being low, the voltage drop across this element in series in the grid-cathode circuit of tubes 10 and 11 is also low, thus making the regulating circuit highly sensitive to changes of line and load voltage to minimize load voltage changes.

What is claimed is:

1. In combination, a circuit comprising a resistor and in series therewith a plurality of parallel branch paths, a condenser in a first of said branch paths, a continuously conductive resistance device in a second of said branch paths and resistance of which device decreases in response to an increase of current flowing therethrough at such a rate that the voltage drop across said device decreases as the current increases, and means for impressing upon said circuit in series with respect to said resistor and said plurality of branch paths an electromotive force for causing current to flow in said first branch path for charging said condenser during an initial period and for simultaneously causing current to flow through said second branch path to reduce the resistance of said resistance device, thereby causing said condenser to be discharged during a period following said initial charging period due to the resulting increased voltage drop across said resistor.

2. A combination in accordance with claim 1 in which there is provided in said first branch path in series with said condenser, resistance means the resistance of which to discharging current of said condenser is many times greater than its resistance to charging current, thereby causing said condenser to be discharged during a period which is long with respect to the charging period due to the relatively large time constant of the condenser discharge circuit.

3. In combination, a circuit having two parallel branch paths a first of which comprises a condenser, and means having resistance for supplying current to said branch paths to cause said condenser to be charged during an initial period, the second of said branch paths comprising continuously conductive resistive means the resistance of which decreases with increase of current supplied to said second branch path to cause said condenser to discharge during a period subsequent to said initial charging period due to the resulting increased voltage drop across said means for supplying current to said branch paths.

4. A combination in accordance with claim 3 in which the condenser discharging circuit has a time constant many times that of the condenser charging circuit.

5. A combination in accordance with claim 3 in which said first path includes in series with said condenser an asymmetrical conducting element the resistance of which to current for charging said condenser is small relative to its resistance to condenser discharge current.

6. Apparatus for controlling the supply of current from a first current source to a load comprising a space discharge device having an anode, a cathode and a control electrode, means for connecting the anode-cathode path of said device in series with said first load and said source, two asymmetrical varistors, a first circuit connecting said control electrode and said cathode comprising said two asymmetrical varistors in series, a second circuit comprising a second current source and a first of said varistors for causing to be set up across said first varistor a voltage having a certain polarity, means for impressing a transient voltage across said second varistor for delaying the supply of current from said first source to said load, and means for impressing a portion of the load voltage upon said second circuit for reversing the polarity of the voltage across said first varistor.

7. Apparatus in accordance with claim 6 in which said means for impressing a transient voltage across said second varistor comprises a condenser, and means for causing current to flow through said second varistor for changing the charge on said condenser, said current flowing through said varistor in its reverse or high resistance direction.

8. Apparatus in accordance with claim 6 in which said portion of said load voltage impressed upon said second circuit has a polarity to cause current to flow through said first varistor in the reverse or relatively high resistance direction.

9. Apparatus in accordance with claim 6 in which said varistors are poled in the same direction in said control electrode-cathode circuit, in which the polarity of the second current source in said second circuit causes current flow through said first varistor in the forward or relatively low resistance direction, and in which the polarity of said transient voltage causes current flow through said second varistor in the reverse or relatively high resistance direction.

10. In combination, a gaseous discharge device having an anode, a cathode and a control electrode, a load circuit including a load and a current source for supplying current to said load through the anode-cathode path of said device when said device is conducting, a current path connecting said control electrode to said load circuit to complete a circuit connecting said control electrode and said cathode and including a portion at least of the voltage across said load, an asymmetrically conducting element in said current path so poled that its resistance is relatively low to current from said source flowing in said path when said space discharge device is conducting, thereby providing a relatively low resistance path for coupling the control electrode to the load circuit, and means for causing a transient current to flow through said asymmetrically conducting element in its reverse or high resistance direction to set up a biasing voltage for delaying the flow of current from said source in said load circuit.

11. A combination in accordance with claim 10 in which there is provided in a portion of said control electrode-cathode circuit between said asymmetrically conducting element and said load circuit a voltage source in opposition to the portion of the load voltage in said control electrode-cathode circuit and in which there are provided a shunt current path connecting said cathode to the terminal of said asymmetrically conducting element which is connected to said portion of said control electrode-cathode circuit, and a second asymmetrically conducting element in said shunt path so poled that current from said voltage source flows therethrough in its forward or low resistance direction when no current is being supplied to the load circuit through said anode-cathode path and in the opposite direction therethrough when current is being supplied to the load through said anode-cathode path in normal operation.

12. A combination in accordance with claim 10 in which there is provided in a portion of said control electrode-cathode circuit between said asymmetrically conducting element and said load circuit a voltage source in opposition to the portion of the load voltage in said control electrode-cathode circuit, the voltage of said voltage source having variations corresponding to voltage variations of said current source from which current is supplied to said load and in which there are provided a shunt current path connecting said cathode to the terminal of said asymmetrically conducting element which is connected to said portion of said control electrode-cathode circuit, and a second asymmetrically conducting element in said shunt path so poled that current from said voltage source flows therethrough in its forward or low resistance direction when no current is being supplied to the load circuit through said anode-cathode path and in the opposite direction therethrough when current is being supplied to the load through said anode-cathode path in normal operation.

13. A regulated rectifier comprising a gaseous space discharge device having an anode, a cathode, and a control electrode, a load circuit including a load, the anode-cathode path of said space discharge device and a source of alternating current from which current is supplied to said load through said anode-cathode path of said device when said device is conducting, a circuit connecting the control electrode and cathode of said device comprising a first and a second asymmetrical varistor in series, a terminal of said second varistor being connected to said cathode, a shunt path across said second varistor comprising in series a portion at least of the load voltage when current from said alternating source is being supplied to the load and a voltage of opposite polarity thereto having variations corresponding to voltage variations of said alternating current source, the polarity of the resultant voltage across said second varistor being reversed when current is supplied to said load circuit to change said second varistor from a low resistance to a high resistance state, said first varistor providing a low resistance coupling to said load circuit when said discharge device is conducting due to grid current flowing therethrough in its forward or low resistance direction, means for supplying heating current to said cathode, and means for supplying to said first varistor a current which flows therethrough in its reverse or high resistance direction and which decreases while the temperature of said cathode is increasing due to the heating current supplied thereto, thereby setting up a biasing voltage across said first varistor to prevent the flow of space current in said discharge device while said cathode is below normal operating temperature.

14. In combination, a space discharge device having an anode, a cathode and a control electrode, a first circuit connecting said anode and said cathode including a load, means for supplying current from an alternating current source to said load through the anode-cathode path of said device when said device conducts space current, a shunt path connected across said load comprising an asymmetrically conducting element having resistance to current flow in one direction therethrough many times greater than its resistance to current flow in the reverse direction therethrough, a source of unidirectional electromotive force for causing current to flow in one direction through said asymmetrically conducting element when the load voltage is relatively low, a portion of the space current of said device flowing through said asymmetrically conducting element in the opposite direction when said load voltage is relatively high, and a second circuit connecting said control electrode and said cathode comprising said asymmetrically conducting element, thereby impressing upon said control electrode with respect to said cathode a potential for controlling the space current in said device.

15. In combination, a thermionic device having an anode, a cathode and a control electrode, a current supply source, a first circuit for supplying heating current from said supply source to said cathode, a second circuit connecting said anode and said cathode, a load, means for supplying current from said source through said second circuit to said load when said thermionic device conducts space current, a third circuit connecting said control electrode and said cathode, means for initiating conduction of space current in said device at the end of a delay period following the starting of the supply of heating current to said cathode comprising means for setting up in said third circuit when said means is energized by current from said supply source a gradually changing voltage and means for supplying current to said last-mentioned means concurrently with the supply of heating current to said cathode.

16. A combination in accordance with claim 15 in which the means for setting up said gradually changing voltage comprises a condenser, an asymmetrical varistor, and means for causing current to flow through said condenser and varistor in series to change the charge on said condenser.

17. In combination, a condenser, an asymmetrically conducting varistor, a thermistor, a first current path comprising said condenser and said varistor in series, a second current path connected across said first current path, said second current path comprising said thermistor, a source of current, and means for supplying current from said source to said current paths, said means having resistance through which the currents in said paths respectively flow.

18. A current rectifying circuit adapted to be connected to an alternating current supply source for supplying rectified current to a load connected to a pair of output terminals comprising space discharge rectifying means having a space current path through which current from said source is supplied to the load and having space current control means, a shunt current path connected between said output terminals, a condenser in said shunt path, means for connecting said control means to said shunt path, means for charging said condenser to prevent the flow of space current in said space discharge means during an initial period following the connection of said circuit to said supply source, means in said shunt path for discharging said condenser to cause the rectified current supplied to the load by said rectifying means to increase gradually during a period following said initial period, and means in said shunt path for subsequently causing load voltage changes to be minimized.

19. In combination, a condenser, an asymmetrically conducting varistor, a thermistor, a first current path comprising said condenser and said varistor in series, a second current path connected across said first current path, said second current path comprising said thermistor, a source of current, means for supplying current from said source to said current paths, said means having resistance through which the currents in said paths respectively flow, a space current device having an anode, a cathode and a control electrode, means for supplying space current through said space current device to a load, and a circuit connecting said control electrode and said cathode for controlling said space current, said circuit comprising said condenser.

20. In combination, a condenser, an asymmetrically conducting varistor, a thermistor, a resistor, a first current path comprising said condenser and said varistor in series, a second current path connected across said first current path, said second current path comprising said thermistor, a source of alternating current, and means for supplying current from said source through said resistor to said current paths.

21. In combination, a condenser, an asymmetrically conducting varistor, a thermistor, a resistor, means for deriving a first and a second alternating voltage source from a source of alternating current, a first current path comprising said condenser and said varistor in series, a second current path connected across said first current path, said second current path comprising said thermistor, means for connecting said first voltage source in series in one only of said current paths, and means for supplying current from said second voltage source through said resistor to said current paths.

22. A combination in accordance with claim 21 in which said first voltage source is substantially opposed in phase with respect to the voltage set up across said thermistor due to the current flowing therethrough in the circuit formed by said first and second current paths.

23. Apparatus for controlling the supply of current from a first current source to a load comprising a space current device having an anode, a cathode and a control electrode, means for connecting the anode-cathode path of said device in series with said load and said first source, two asymmetrical varistors, a first circuit connecting said control electrode and said cathode comprising said two asymmetrical varistors in series, a second circuit comprising a second current source and a first of said varistors for causing to be set up across said first varistor a voltage having a certain polarity, means for impressing a transient voltage across said second varistor for delaying conduction through said space current device and thereby delaying the supply of current from said first source to said load, and means effective when said space current device is conductive for supplying current from said first source through said space current device and through each of said asymmetrical varistors to cause the polarity of the voltage across each of said varistors to be reversed.

JAMES A. POTTER.

REFERENCES CITED

The following references are of record in the file of this patent:

UNITED STATES PATENTS

| Number | Name | Date |
| --- | --- | --- |
| 472,193 | Marshall | Apr. 5, 1892 |
| 2,085,100 | Knowles et al. | June 29, 1937 |
| 2,158,885 | Palmer | May 16, 1939 |
| 2,169,023 | Dawson | Aug. 8, 1939 |

FOREIGN PATENTS

| Number | Country | Date |
| --- | --- | --- |
| 113,839 | Australia | Sept. 10, 1941 |